Patented Dec. 6, 1938

2,139,081

UNITED STATES PATENT OFFICE 2,139,081

PROCESS FOR IMPROVING RESINS AND FATTY OILS

Herbert Hönel, Vienna, Austria, assignor to Helmuth Reichhold, Detroit, Mich., doing business as Reichhold Chemicals No Drawing. Application October 4, 1935, Serial No. 43,642. In Germany October 10, 1934

4 Claims. (Cl. 260—19)

This invention relates to a process for improving resins, waxes, fatty oils and materials containing same. The invention further relates to new condensation products of the phenol-aldehyde-type, reaction products of high molecular weight, prepared from the said condensation products and resins, waxes, fatty oils and the like, and to insoluble and nonfusible plastic masses.

According to the invention the materials to be improved are reacted by the application of heat with small quantities of neutralized condensation products which are obtained with the aid of strong alkalies as contact agents from formaldehyde in excess over the equimolecular quantity and mixtures of phenols containing as main constituent phenols having only two reaction favorable positions (o—, o—, p—) in the molecule unoccupied and a small quantity of phenols having more than two reaction favorable positions unoccupied.

For carrying through the new process a mixture of several phenols is used as starting material, and it is above all essential that only a small quantity of phenols having more than two reaction favorable positions unoccupied—in general about 10% or less—should be present in this mixture.

The inventor has previously found, that condensation products with self-hardening properties, i. e., products which on heating pass over into higher condensation-stages or are converted into products of higher molecular weight or become insoluble and nonfusible, and which are capable of combining with substantially neutral resins, waxes, fatty oils and the like to form homogeneous masses, can be produced from phenols having only two reaction favorable positions unoccupied and formaldehyde in excess over the equimolecular quantity, by carrying out the condensation with strong alkalies as contact agents and at relatively low temperature for a prolonged period of time.

It had been regarded heretofore as an essential condition by the inventor that all phenols having more than two reaction favorable positions unoccupied should be excluded from the reaction-mixture.

Now it was found unexpectedly that it is possible to use phenols as aforesaid as starting materials. But it is essential that they should only be present in small quantities and that the condensation products should be free from the strong alkali used as contact agent by neutralization. The latter can be effected during the course of the condensation, preferably before the condensation products have reached the resinous stage, i. e., before they have been converted into products of high molecular weight.

The possibility of co-employing phenols as aforesaid constitutes, from the technical standpoint, a considerable simplification of the process as well as an increased economy in working. It is now no longer necessary, by careful fractionation, to remove the phenols which have hitherto been considered unfavorable and a hindrance to the reaction, or to employ as starting material a phenol of a definite type and of a high degree of purity. On the contrary it is possible to use technical mixtures as starting material. A further advantage in the use of such mixtures is to be found in the fact that the appearance of cloudiness, such as occasionally occurs if chemically pure phenols are used, is prevented.

Furthermore the co-employment of phenols having more than two reaction favorable positions unoccupied brings about a still greater improvement in the quality of the materials under treatment than is the case when using condensation products prepared from phenols with only two reaction favorable positions unoccupied. A further effect of the co-employment of phenols having more than two reaction favorable positions unoccupied is that the relatively small improving effect of phenols having only one reaction favorable position unoccupied—if such are present in the mixture—can be compensated.

It was also unexpectedly found that the quantity of the phenol having all or more than two reaction favorable positions unoccupied may be the greater, the greater the quantity of the phenol having only one reaction favorable position unoccupied which is simultaneously present. When using mixtures as aforesaid the phenol having only two reaction favorable positions unoccupied preferably constitutes the greater part of the mixture. But it is also possible to use mixtures containing larger quantities of phenols, in which only one reaction favorable position is unoccupied. In this case, however, it is advisable to ensure the presence of larger quantities of phenols having all or more than two reaction favorable positions unoccupied than the above named 10%. For example (as a limit) a mixture of phenols may be used which contains up to 80% of phenols having only one reaction favorable position unoccupied and up to 20% of phenols having more than two reaction favorable positions unoccupied.

The term phenols is to be understood to include not only the mono- and polyhydric and mono- and polynuclear phenols having only two reaction favorable positions in the molecule unoccupied, but also all analogous phenols having only one reaction favorable position in the molecule unoccupied. Similarly, phenols having three and more reaction favorable positions unoccupied are to be understood to include mono- and polyhydric mononuclear phenols, such as phenol or phenols being only substituted in the m-position such as m-cresol etc., as well as polynuclear phenols such as dihydroxydiphenyl, dihydroxydiphenyl-methane and its homologues such as -ethane, -propane, -butane etc., dihydroxy-diphenyl-cyclohexane, dihydroxy-triphenyl-methane or derivatives thereof, or dihydroxy-diphenyl-menthane or other polyphenolic terpene like substances of a similar constitution; alpha-naphthol and the dihydroxy-naphthalenes also belong to this group.

The substituents of the phenols to be employed according to this invention may be: hydrocarbon radicals (aliphatic, aromatic, mixed aliphatic-aromatic or hydroaromatic) hydroxylalkyls and chlorine.

The condensation is preferably effected for a prolonged period of time with an excess of formaldehyde in the presence of strong alkalies as contact agents and at low temperatures. After carefully neutralizing and washing either thin liquid or crystalline condensation products or condensation products of higher molecular weight in the form of viscous to semi-solid masses are obtained. The time of reaction and temperature are of particular influence on the nature of the condensation product. The low molecular condensation products of phenol-polyalcoholic nature first obtained can be converted by heat into resinous products. The desired degree of condensation may, also, be obtained by suitable heating before neutralizing. In this connection the fact has to be taken into consideration that phenols being substituted in meta-position to the phenolic hydroxyl group, such as m-cresol, and still more dihydroxybenzenes lead to condensation products having a particularly high rate of hardening and must therefore not be employed in too large proportion.

It is of advantage to use as starting materials such phenols or mixtures of phenols which are all or for the greater part substituted in p-position to the phenolic hydroxyl group. The simplest representative of this group is p-cresol. Mixtures of such phenols yield condensation products showing great fastness to light and no disturbing yellowing phenomena.

Furthermore it is advisable to carry out the condensation with such quantities of formaldehyde that at least 1,4 mols are fixed by the phenols. In this case masses having a pronounced hardenable character are produced.

In order to use such condensation products with pronounced hardenable character for improving waxes and any fatty oils it is necessary to make a very particular selection among the phenols to be used as starting material. An adequate proportion of the substituted phenols employed must have higher substituents of aliphatic, aromatic, mixed aliphatic-aromatic or hydroaromatic nature. The term higher substituents is as a rule to be understood to include hydrocarbon radicals containing at least three saturated carbon atoms. It is immaterial which of the phenols in the mixture of phenols have the higher substituent or substituents. The general rule applies, that in the mixture of phenols the ratio of saturated C-atoms to phenolic hydroxyl-groups must be greater than 2:1, i. e., on an average more than 2 saturated C-atoms must be present for each phenolic hydroxyl group.

When condensation products of the last named type are produced, it is advisable to carry out the condensation, preferably after neutralization, until solid, resinous products are formed since the latter are much more easily and conveniently handled than masses of lower molecular weight and of oily, soft or semi-solid consistency.

In order to combine the last mentioned oil reactive condensation products with oils it is advisable to avoid working with too little oil; with raw linseed oil the amount of oil should be at least 1 to 1.5 times the weight of the condensation product in order to prevent gelatinization. It is only advisable to employ a smaller proportion of oil when it is intended to produce stove drying varnishes in which the hardening reaction is performed subsequently, i. e., in the film, or when plastic hardenable masses are to be produced. In general the fundamental principle applies, that the amount of oil required to avoid gelatinization must be the greater, the higher the viscosity of the raw oil: with a thin stand oil the lower limit of the ratio of oil to condensation product may be regarded as being about 4:1, while for thick stand oil it may be as high as 10:1. In any event, a very large increase in viscosity takes place accompanied by enhanced drying power. When working up these condensation products with oils it is also advisable first to effect complete solution of the condensation product in the oil below 160° C. and only then to raise the temperature above 200° C. In general, final temperatures from 200 to 240° C. are entirely adequate to produce the desired effect, but it is also possible under certain conditions to heat to temperatures ranging up to 270° C. and higher.

By reacting the new condensation products with resins, for example readily available neutral resins such as coumarone resins, ester gums, or other synthetic or natural resins, e. g., phenol aldehyde resins, dammar and the like the resins get a higher melting point and a greater hardness; in general the qualities in respect to their utilization for lacquers and varnishes are considerably improved.

Waxes, for example, Montan wax also acquire a greater hardness and elasticity, a higher melting point etc.

Fatty oils acquire a very considerable increase in their viscosity, while drying oils yield a faster and harder drying varnish which is of high elasticity and of considerably greater resistance to external influences, particularly to alkalies. Tung oil loses its well-known unsatisfactory manner of drying. The group of drying oils includes all raw materials known for preparing lacquers and varnishes, e. g., raw oils such as a linseed-oil, tung-oil, other vegetable oils, mixtures of any kind, but also chemically treated oils, for example, oils which have been slightly polymerized by heating. The most important exampes of oils as aforesaid are the products known as stand oils which consist of one oil or of a mixture of several oils.

When preparing plastic hardenable masses plasticizing agents, such as castor oil, can be added in unlimited quantities without decomposition occurring during the hardening process.

EXAMPLES

The following specific examples are given by way of illustration and not by way of limitation.

It will be understood that where the term "aqueous formaldehyde" is used in the examples, a commercial solution of 40% by volume is referred to.

Example 1

100 grms. of crude p-tertiary-amylphenol, contaminated with about 8% of ordinary phenol, is mixed with 100 grms. of aqueous formaldehyde and 80 ccm. 3n sodium hydroxide, and allowed to stand for about 10 days at ordinary or slightly elevated temperature. The condensation product is then precipitated with an acid, carefully neutralized and washed. The product is a very viscous liquid.

This condensation product is readily soluble in all oils for example castor oil, linseed-oil, tungoil, similar vegetable oils or mixtures of the said oils and yields clear reaction products when heated therewith to temperatures of from 160 to 220° C. These reaction products have considerably higher viscosities than the original oil and are particularly suited for use as varnish bases.

Combination of the condensation product with about 5 times its amount of molten Montan wax, on heating to 220° C., yields a product which is considerably harder and tougher, and has a higher melting point, than the original wax.

The liquid to viscous condensation products can be converted by heating to temperatures somewhat above 100° C., into a resin which is solid at ordinary temperature. This resin also shows remarkably good compatibility with resins, fatty oils and the like.

Example 2

Diphenylolpropane, made by passing hydrogen chloride through phenol and acetone, is chlorinated. 100 grms. of the resulting 4,4'-dihydroxy-3,3'-dichlorodiphenylpropane, which is contaminated with varying amounts (up to 10%) of diphenylolpropane which is not chlorinated or is chlorinated in only one 3-position, are condensed with 90 grms. of aqueous formaldehyde and 24 grms. of aqueous sodium hydroxide in the manner described in Example 1, then precipitated with acid and carefully neutralized.

The condensation product thus obtained is introduced into about 8 times its amount of resin glyceride heated above 100° C., and the temperature is then raised to about 220° C. A clear resin, easily soluble in gasoline, benzene hydrocarbons and other varnish solvents, and well suited for use in the manufacture of oil varnishes is obtained.

Example 3

140 grms. of a mixture of about 100 parts p-tertiary-butylphenol, 15 parts of phenol and 25 parts of dibutylphenol (ortho and para) are mixed with 120 grms. of aqueous formaldehyde and 24 grms. of sodium hydroxide solution. The mixture is allowed to stand at ordinary or slightly elevated temperature until all the formaldehyde is combined. The liquid to viscous condensation product, obtained by precipitation, careful neutralization and washing, is converted, by heating to temperatures from 100 to 130° C., into a resin which is solid at ordinary temperature.

One part of this resin is combined with 6 parts of tung-oil. The resulting solution is heated to about 220° C. After a vigorous reaction a clear, highly viscous product is obtained which is particularly suited to the manufacture of varnishes.

This resin is readily soluble in all raw and boiled oils, i. e., slightly polymerized oils such as stand-oils and also in gasoline. In order to dissolve it an stand-oil, more than 10 times its quantity of oil is necessary to avoid gelatinization during the reaction.

A solution in 3 to 5 times its quantity of stand oil is especially suitable for making baking varnishes.

Example 4

A mixture obtained by incomplete benzylation of commercial m-cresol (60% m- and 40% p-cresol) and still containing, in addition to p-cresol and o- and p-benzyl-m-cresol about 10% free m-cresol and cresol (in larger amounts than the equivalent of the m-cresol which is still free), is condensed with an approximately equal amount of aqueous formaldehyde with the aid of sodium hydroxide (about ⅕ of the weight of formaldehyde) at 20 to 40° C.

The condensation product obtained after precipitation with acid, careful neutralization and washing is characterized by an especially high rate of hardening and hence is particularly suitable for use in making plastics.

If one part of this condensation product is introduced into 8 parts of molten dammar, preferably in the presence of a small amount of a solvent such as varnish naphtha, and heated to 220° C. a very pale, hard resin is obtained which melts about 50° C. higher.

Example 5

A mixture of 120 grms. of 4,4'-dihydroxy-3,3'-dimethyldiphenylcyclohexane, 20 grms. of diphenylolcyclohexane and 30 grms. of dibutylphenol (ortho and para) is brought into solution with 130 grms. of aqueous formaldehyde and 25 grms. of sodium hydroxide and allowed to stand for a long time at 30° C. The condensation product is precipitated with an acid, carefully neutralized and washed, and converted into a solid resin by heating to about 100° C.

This resin possesses remarkably good oil compatibility and yields, for example with drying oils, such as linseed-oil, tung-oil, maize-oil, rapeseed-oil, and the like and also with mixtures of the several oils, reaction products which have excellent properties for use in varnish making.

Example 6

100 parts of crystalline dihydroxy-diphenylmenthane, which may for example be obtained from dipentene-dihydrochloride and excess of phenol with the aid of aluminum chloride or the like as a catalyst, 200 parts of formaldehyde (40% by volume), and 10 parts of sodium hydroxide are heated to about 40° C. and stirred until a clear solution is formed. After 2 weeks the reaction mixture is acidified and the resinous condensation product which is kneadable at about 50° C. is washed several times. Finally it is pulverized, subjected to suctional filtration and dried.

One part of the resulting condensation product of phenol-polyalcohol nature is melted together with 4 parts of a carefully neutralized phenol-polyalcohol formed from one mol of p-cyclohexylphenol and 2 mols of formaldehyde. The reaction mixture is heated at temperatures above 100° C. until a clear resin is formed which is solid at ordinary temperature.

The product is of pronounced resolic nature.

It is readily soluble in drying oils and, when heated together therewith, yields homogeneous reaction masses particularly useful in the manufacture of varnish. The enormous increase in viscosity which may easily lead to gelatinization, is particularly noteworthy.

By reacting the product with ester gums or other neutral resins homogeneous hard products of high melting point are obtained. The same result is achieved if the quantity of the p-cyclohexyphenol is reduced to about 2 to 3 parts or substituted by p-cresol or chlorophenol.

I claim:

1. A process for producing a clear homogeneous reaction product; which comprises reacting (1) a substantially neutral varnish making raw material selected from a group consisting of fusible resins and fatty oils with (2) a heat hardenable condensation product obtained by condensing with the aid of a strong alkaline catalyst as contact agent (a) formaldehyde in excess over the equimolecular quantity, and (b) a mixture of phenols consisting of a major proportion of at least one phenol selected from a group consisting of phenols having at least one but not more than two reaction favorable positions unoccupied, and a minor proportion of a phenol having more than two reaction favorable positions unoccupied, the phenols employed in the process having as an average more than two saturated C atoms per each phenolic hydroxyl group; the process being characterized by the complete elimination of the alkaline catalyst, and the final reaction product of the varnish making raw material and phenolic condensation product being of substantially increased viscosity.

2. A process as set forth in claim 1, wherein the mixture of phenols includes a phenol having only one reaction favorable position unoccupied, and the quantity of phenol having more than two reaction favorable positions unoccupied has an upper limit of 20% when no phenols having two reaction favorable positions unoccupied are employed, the quantity of phenols having more than two reaction favorable positions unoccupied being smaller as the relative quantity of phenols having two reaction favorable positions unoccupied is increased.

3. A process as set forth in claim 1, wherein the mixture of phenols includes a phenol having two and only two reaction favorable positions unoccupied and a minor proportion up to 10% of a phenol having more than two reaction favorable positions unoccupied.

4. A clear homogeneous reaction product produced according to claim 1.

HERBERT HÖNEL.